US012106917B2

(12) United States Patent
Matsuo et al.

(10) Patent No.: US 12,106,917 B2
(45) Date of Patent: Oct. 1, 2024

(54) SOCKET

(71) Applicant: OMRON Corporation, Kyoto (JP)

(72) Inventors: Shinya Matsuo, Kyoto (JP); Kenichiro Masaki, Kyoto (JP); Shinya Tsuji, Kyoto (JP)

(73) Assignee: OMRON CORPORATION, Kyoto (JP)

(*) Notice: Subject to any disclaimer, the term of this patent is extended or adjusted under 35 U.S.C. 154(b) by 237 days.

(21) Appl. No.: 17/885,002

(22) Filed: Aug. 10, 2022

(65) Prior Publication Data

US 2023/0062343 A1 Mar. 2, 2023

(30) Foreign Application Priority Data

Aug. 27, 2021 (JP) ................................ 2021-139212

(51) Int. Cl.
*H01H 45/04* (2006.01)
*H01H 50/04* (2006.01)
*H01R 13/514* (2006.01)

(52) U.S. Cl.
CPC .......... *H01H 50/048* (2013.01); *H01H 45/04* (2013.01); *H01R 13/514* (2013.01)

(58) Field of Classification Search
CPC ...... H01H 50/048; H01H 45/04; H01H 50/14; H01R 13/514; H01R 9/2625
USPC .......................................................... 335/202
See application file for complete search history.

(56) References Cited

U.S. PATENT DOCUMENTS

| | | | | |
|---|---|---|---|---|
| 9,060,427 | B2 | 6/2015 | Binner | |
| 2003/0224639 | A1 | 12/2003 | Yano et al. | |
| 2013/0341083 | A1* | 12/2013 | Binner ................ | H01R 13/635 174/541 |

(Continued)

FOREIGN PATENT DOCUMENTS

| | | | |
|---|---|---|---|
| EP | 1353413 | A1 | 10/2003 |
| EP | 3439011 | A1 | 2/2019 |

(Continued)

OTHER PUBLICATIONS

EPO Extended European Search Report for corresponding EP Application No. 22189509.7; Issued on Jan. 19, 2023.

*Primary Examiner* — Shawki S Ismail
*Assistant Examiner* — Lisa N Homza
(74) *Attorney, Agent, or Firm* — CANTOR COLBURN LLP

(57) ABSTRACT

A socket includes a housing including a connection surface to which an electronic device is connected, and a lever attached to the housing to be rotatable. The lever includes an operation portion that is rotatable between a first position and a second position and a contact portion that extends from the operation portion in a direction approaching the connection surface and rotates about the rotation axis together with the operation portion. The housing includes a restriction protrusion that comes into contact with a protruding portion protruding from the side portion of the electronic device toward the operation portion at the second position to restrict a movement of the electronic device in the first direction and in a direction away from the connection surface when the operation portion is rotated from the first position to the second position in a state where the electronic device is connected to the connection surface.

6 Claims, 6 Drawing Sheets

(56) References Cited

U.S. PATENT DOCUMENTS

| | | | | |
|---|---|---|---|---|
| 2015/0173223 | A1* | 6/2015 | Binner | H05K 5/0247 174/50 |
| 2019/0044282 | A1 | 2/2019 | Mickmann | |
| 2019/0288412 | A1* | 9/2019 | Masaki | H01R 9/18 |
| 2019/0288414 | A1* | 9/2019 | Masaki | H01R 9/2608 |
| 2020/0266566 | A1* | 8/2020 | Shimada | H01R 13/639 |
| 2022/0158370 | A1* | 5/2022 | Tsuji | H01H 45/04 |

FOREIGN PATENT DOCUMENTS

| | | | |
|---|---|---|---|
| JP | 2005108767 | A | 4/2005 |
| WO | 2021116131 | A1 | 6/2021 |

* cited by examiner

SOCKET

CROSS REFERENCES TO RELATED APPLICATIONS

The present invention claims priority under 35 U.S.C. § 119 to Japanese Application, 2021-139212, filed on Aug. 27, 2021, the entire contents of which being incorporated herein by reference.

TECHNICAL FIELD

The present disclosure relates to a socket.

DESCRIPTION OF THE RELATED ART

Patent Document 1 discloses a relay socket including a release lever capable of preventing rotation and falling off of a relay mounted on a relay mounting portion. In the relay socket, the release lever includes an abutment portion facing a back surface of the relay mounted on the relay mounting portion, and an operation portion continuously extending to a front surface side from the abutment portion and is configured to be swingable between a holding position and a retraction position.

CITATION LIST

Patent Document 1: JP No. 2005-108767 A

SUMMARY

In the relay socket, the relay is displaced in a direction in which the relay is removed from the relay mounting portion by the abutment of the abutment portion when the release lever swings from the holding position to the retraction position by an action of an operating force on the operation portion. Therefore, when the lever mounted on the relay mounting portion is removed, a displacement in the direction in which the relay is removed becomes too large depending on the operation force on the operation portion, and the relay may fall from the relay socket.

An object of the present disclosure is to provide a socket capable of preventing an electronic device from falling when the electronic device is removed.

A socket according to one aspect of the present disclosure includes:

a housing including a connection surface to which an electronic device is attached; and a lever attached to the housing to be rotatable about a rotation axis extending along the connection surface, wherein the lever includes:

an operation portion that extends in a first direction intersecting the connection surface, includes an end in the first direction exposed to an outside of the housing, and is rotatable about the rotation axis between a first position adjacent to a side portion of the electronic device which extends in the first direction and a second position that is farther from the side portion than the first position; and a contact portion that extends from the operation portion in a second direction intersecting the first direction and in a direction approaching the connection surface and rotates about the rotation axis together with the operation portion, and in which, when the operation portion is located at the first position, a distal end portion far from the operation portion in the second direction faces the connection surface in a circumferential direction of the rotation axis inside the housing, and when the operation portion is located at the second position, the distal end portion faces the connection surface in the circumferential direction outside the housing, and wherein the housing includes a restriction protrusion that comes into contact with a protruding portion protruding from the side portion of the electronic device toward the operation portion at the second position to restrict a movement of the electronic device in the first direction and in a direction away from the connection surface when the operation portion is rotated from the first position to the second position in a state where the electronic device is connected to the connection surface.

The socket according to the aspect includes the housing including the connection surface to which the electronic device is attached, and the lever attached to the housing to be rotatable about the rotation axis extending along the connection surface. The lever includes the operation portion that extends in the first direction and includes an end in the first direction exposed to the outside of the housing, and the contact portion that extends from the operation portion in the second direction and in the direction approaching the connection surface and rotates about the rotation axis together with the operation portion, and the housing includes the restriction protrusion. The operation portion is configured to be rotatable about the rotation axis between the first position adjacent to the side portion of the electronic device which extends in the first direction and the second position farther from the side portion than the first position. In the contact portion, when the operation portion is located at the first position, the distal end portion in the second direction faces the connection surface in the circumferential direction with respect to the rotation axis inside the housing, and when the operation portion is located at the second position, the distal end portion faces the connection surface in the circumferential direction with respect to the rotation axis outside the housing. When the operation portion is rotated from the first position to the second position in a state where the electronic device is connected to the connection surface, the restriction protrusion comes into contact with the protruding portion protruding from the side portion of the electronic device toward the operation portion at the second position to restrict the movement of the electronic device in the first direction and in the direction away from connection surface. With such a configuration, it is possible to realize a socket capable of preventing an electronic device from falling when the electronic device is removed.

DESCRIPTION OF EMBODIMENTS

Hereinafter, an example of the present disclosure will be described with reference to the accompanying drawings. In the following description, terms indicating specific directions or positions (for example, terms including "up," "down," "right," and "left") are used as necessary, but the use of these terms is to facilitate understanding of the present disclosure with reference to the drawings, and the technical scope of the present disclosure is not limited by the meanings of these terms. Further, the following description is merely exemplary in nature and is not intended to limit the present disclosure, an object for application, or a usage. Furthermore, the drawings are schematic, and ratios of dimensions and the like do not necessarily match actual ones.

Figure 1:
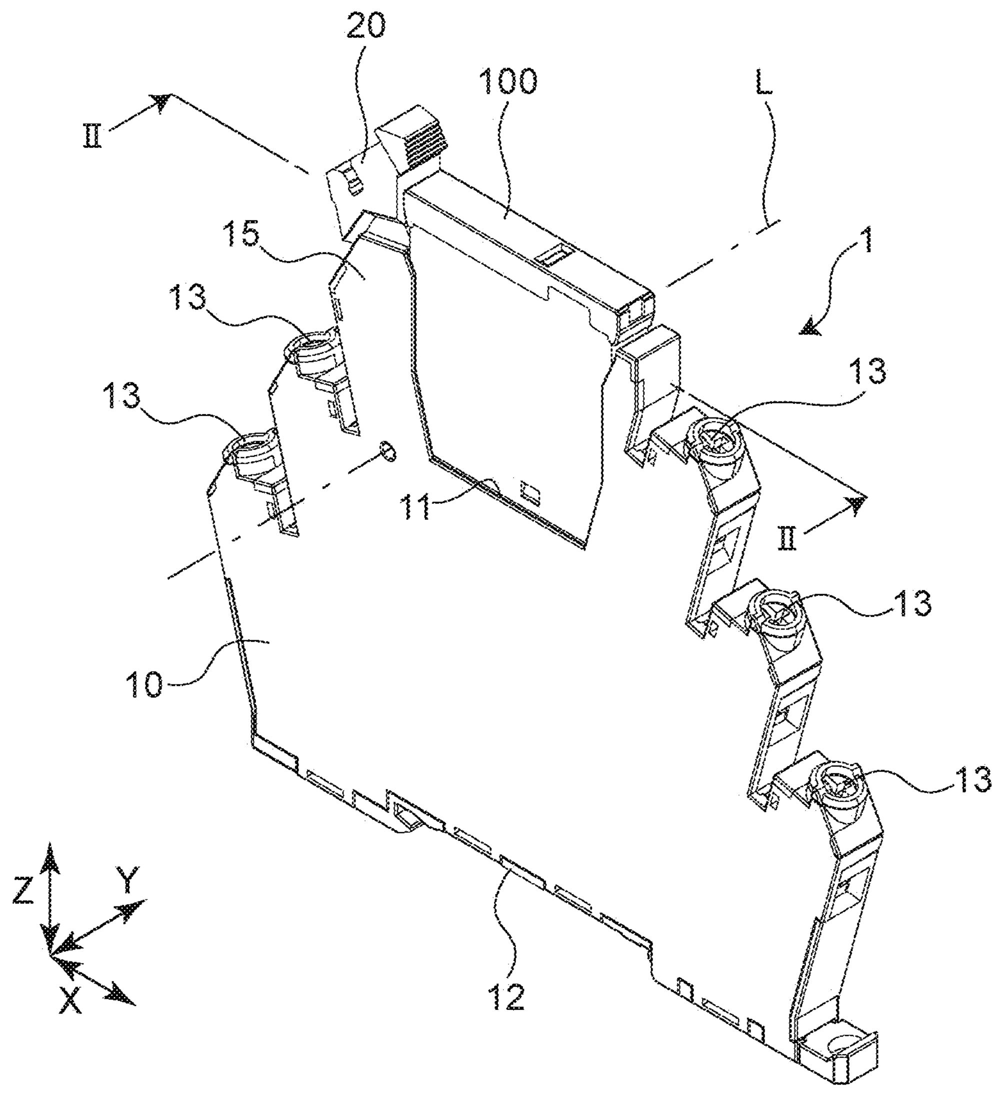
FIG. 1 is a perspective view illustrating a socket according to an embodiment of the present disclosure.

As illustrated in FIG. 1, a socket 1 according to an embodiment of the present disclosure includes a housing 10 and a lever 20 rotatably attached to the housing 10.

The housing 10 includes a connection surface 11 to which an electronic device (for example, an electromagnetic relay) 100 is attached. In the present embodiment, as an example, the housing 10 has a thin plate shape and includes an attachment portion 12 disposed on a side opposite to the connection surface 11 in a first direction (for example, Z direction) intersecting the connection surface 11. The connection surface 11 is disposed substantially at the center of the housing 10 in a width direction (for example, X direction) of the housing 10 which is a second direction intersecting the first direction Z. The housing 10 is attached to an external device (not illustrated) such as a control panel via the attachment portion 12. A plurality of wiring connection portions 13 are provided on both sides of the connection surface 11 of the housing 10 in the second direction X. External wiring (not illustrated) is connected to each wiring connection portion 13.

Figure 2:
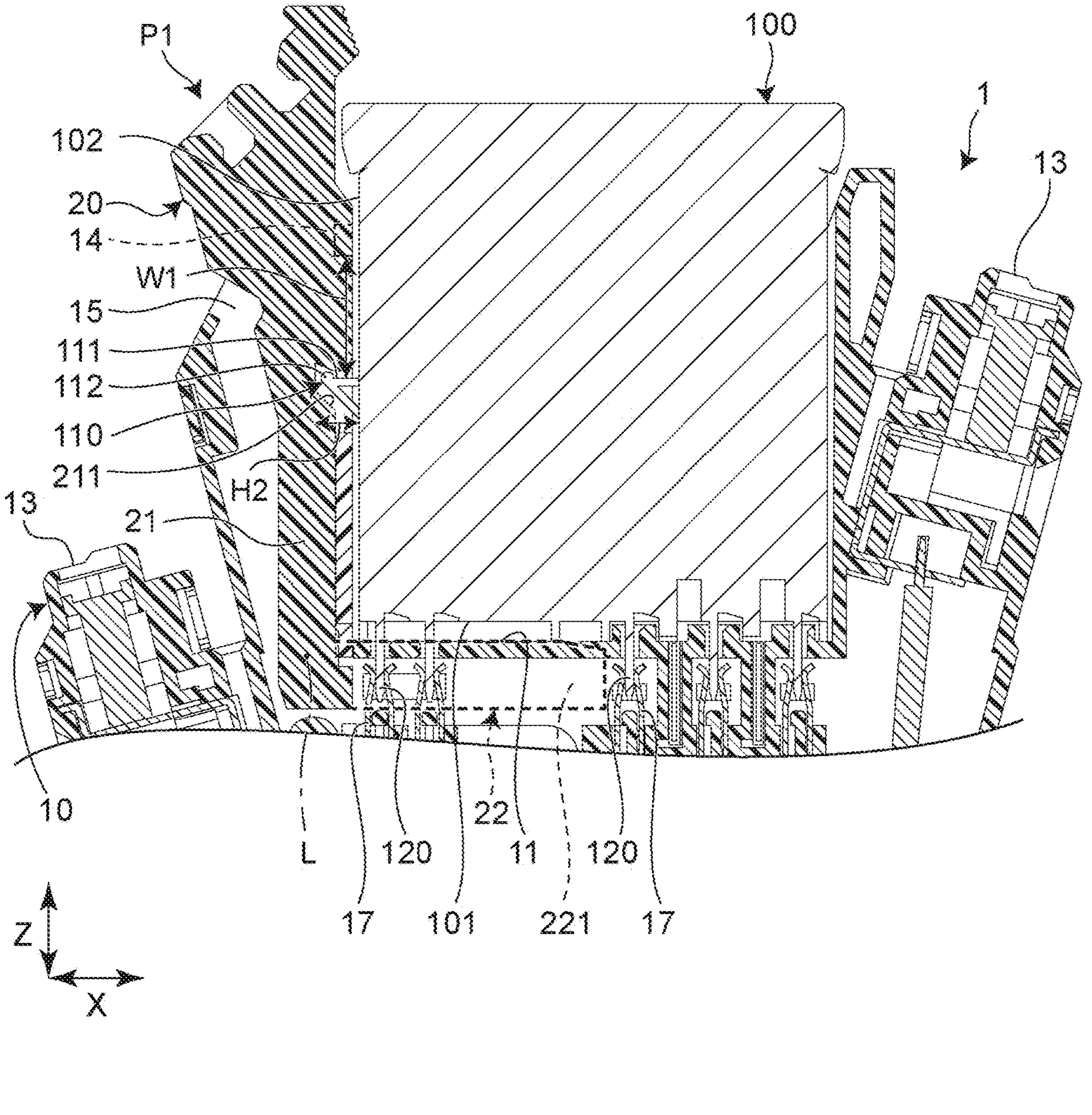
FIG. 2 is a cross-sectional view taken along line II-II of FIG. 1 illustrating a state in which an operation portion is located at a first position.
Figure 3:
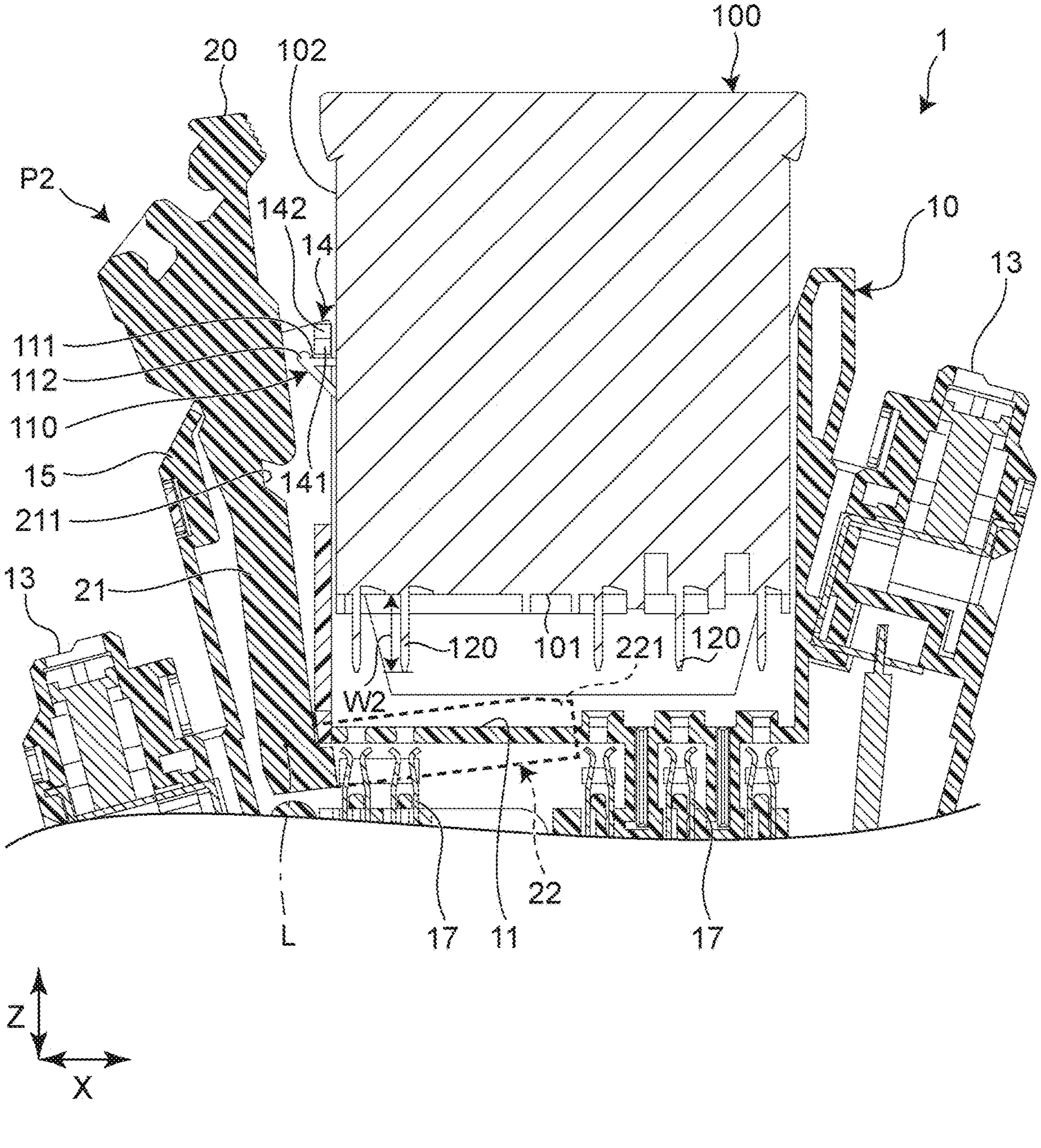
FIG. 3 is a cross-sectional view taken along line II-II of FIG. 1 illustrating a state in which the operation portion is located at a second position.

As illustrated in FIG. 2 and FIG. 3, the housing includes a restriction protrusion 14. When an operation portion 21 of a lever 20 described later is rotated from a first position P1 (see FIG. 2) to a second position P2 (see FIG. 3) in a state where the electronic device 100 is connected to the connection surface 11, the restriction protrusion 14 comes into contact with a protruding portion 110 of the electronic device 100 at a second position P2 to restrict a movement of the electronic device 100 in the first direction Z and in a direction away from the connection surface 11.

Figure 4:
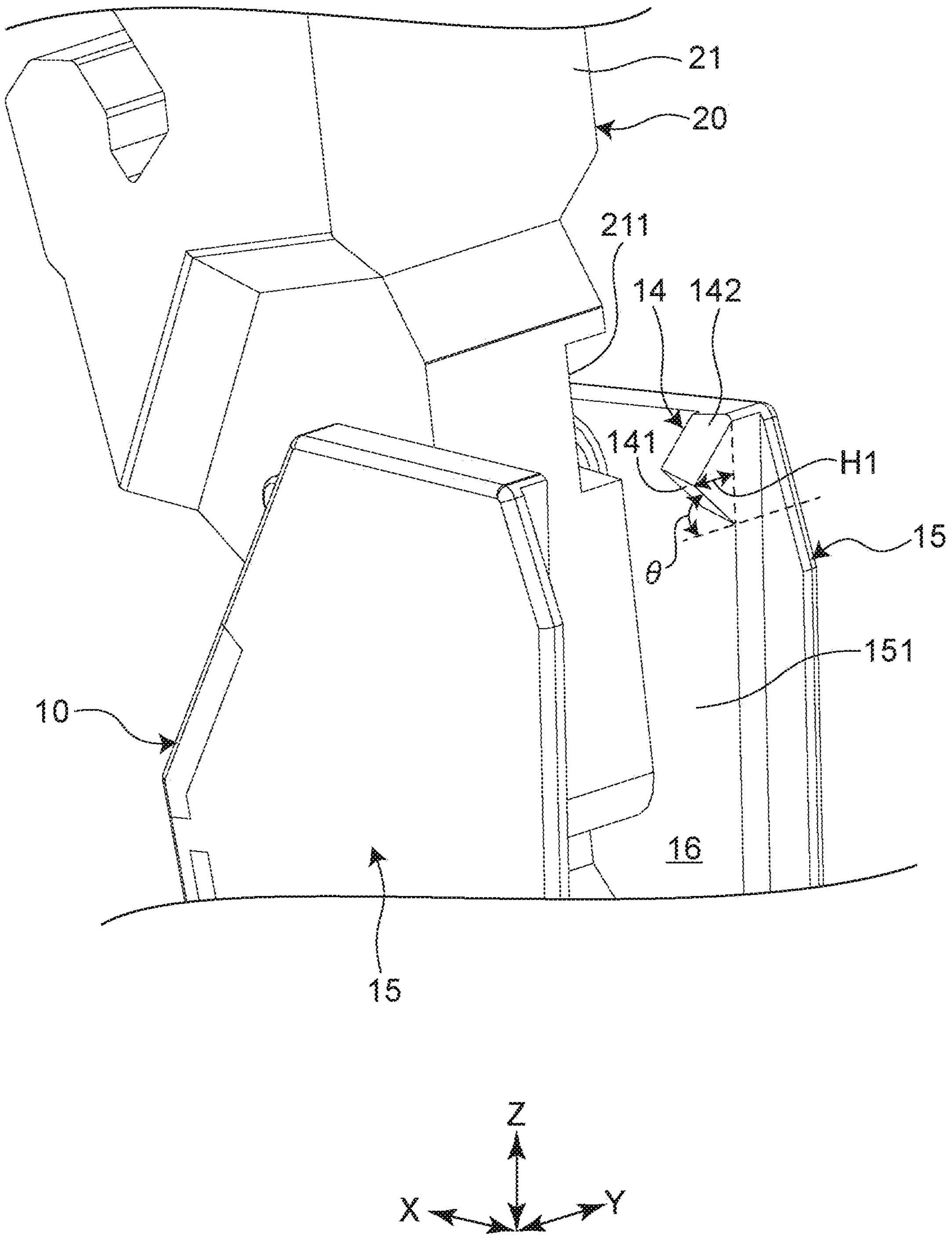
FIG. 4 is an enlarged perspective view of the socket of FIG. 1.

In the present embodiment, the restriction protrusion 14 is provided on a pair of support wall portions 15 of the housing 10. As illustrated in FIG. 2 and FIG. 3, the pair of support wall portions 15 are disposed adjacent to the connection surface 11 in the second direction X. Each support wall portion 15 has a plate shape extending along a plane including the first direction Z and the second direction X, and extends in the first direction Z. As illustrated in FIG. 4, a gap 16 in which the lever 20 is disposed is provided between the pair of support wall portions 15 in a thickness direction (for example, an Y direction) of the housing 10 which is a third direction intersecting the first direction Z and the second direction X. The restriction protrusion 14 is disposed at an end, which is far from the connection surface 11 in the first direction Z of an inner surface 151 of one of the pair of support wall portions 15 (in other words, a surface facing the other of the pair of support wall portions 15).

As illustrated in FIG. 3 and FIG. 4, the restriction protrusion 14 includes an inclined surface 141 that is disposed to face the connection surface 11 and is inclined to approach the operation portion 21 as being away from the connection surface 11 in the first direction Z. In the present embodiment, the restriction protrusion 14 includes an inclined surface 142 that is disposed farther from the connection surface 11 than the inclined surface 141 in the first direction Z and is connected to the inclined surface 141 in the first direction Z. The inclined surface 142 is inclined to be away from the operation portion 21 as being away from the connection surface 11 in the first direction Z, oppositely to the inclined surface 141.

As an example, the electronic device 100 has a substantially rectangular parallelepiped shape and includes a bottom portion 101 and a side portion 102. The bottom portion 101 faces the connection surface 11 in a state where the electronic device 100 is connected to the connection surface 11. The side portion 102 extends in the first direction Z and faces the operation portion 21 of the lever 20 in the second direction X in a state where the electronic device 100 is connected to the connection surface 11. The protruding portion 110 is provided in the middle of the side portion 102 of the electronic device 100 in the first direction Z. The protruding portion 110 includes a facing surface 111 and a locking portion 112. In a state where the electronic device 100 is connected to the connection surface 11, the facing surface 111 faces the restriction protrusion 14 in the first direction Z and is disposed to be able to come into contact with the restriction protrusion 14. In a state where the electronic device 100 is connected to the connection surface 11, the locking portion 112 is disposed farther from the side portion 102 than the facing surface 111 in the second direction X, and is disposed farther from the connection surface 11 than the facing surface 111 in the first direction Z. The bottom portion 101 of the electronic device 100 is provided with a terminal 120 extending from the bottom portion 101 in the first direction Z and accommodated in the housing 10. The terminal 120 is connected to a terminal connection portion 17 provided inside the housing 10. As an example, the terminal connection portion 17 includes a pair of leaf springs capable of holding the terminal 120 from the second direction X.

In the present embodiment, in a state where the electronic device 100 is connected to the connection surface 11, the restriction protrusion 14 is disposed farther from the connection surface 11 than the protruding portion 110 of the electronic device 100 in the first direction Z, and is disposed farther from the protruding portion 110 by a length equal to or larger than the length of the terminal 120 of the electronic device 100 (in other words, a distance W1 (illustrated in FIG. 2) between the restriction protrusion 14 and the protruding portion 110 is larger than a length W2 (illustrated in FIG. 3) of the terminal 120 in the first direction Z.). The distance W1 is, for example, a linear distance between an end of the restriction protrusion 14 closer to the connection surface 11 in the first direction Z and the facing surface 111 of the protruding portion 110.

For example, an inclination angle θ of each of the inclined surfaces 141 and 142 is set in a range of about 30 degrees to about 60 degrees with respect to a plane orthogonal to the inner surface 151 of the support wall portion 15. A height H1 (illustrated in FIG. 4) of the restriction protrusion 14 from the inner surface 151 is set in a range of about 0.2 mm to about 1.2 mm. With this configuration, when the electronic device 100 connected to the connection surface 11 is removed, the protruding portion 110 of the electronic device 100 can get over the restriction protrusion 14 after coming into contact with the restriction protrusion 14, so that the electronic device 100 can be easily removed from the socket. If the height H1 of the restriction protrusion 14 is too high compared to a height H2 (illustrated in FIG. 2) of the protruding portion 110 of the electronic device 100 (for example, H1>1.2 mm), it may be difficult to take out the electronic device 100 from the socket 1. When the height H1 of the restriction protrusion 14 is too low compared to the height H2 (illustrated in FIG. 2) of the protruding portion 110 of the electronic device 100 (for example, H1<0.2 mm), sometimes the movement of the electronic device 100 may not be restricted when the electronic device 100 is taken out from the socket.

The lever 20 is attached to the housing 10 to be rotatable about a rotation axis L extending along the connection surface 11. Specifically, as illustrated in FIG. 2, the lever 20 includes the operation portion 21 and a contact portion 22.

The operation portion 21 has, for example, a rod shape extending in the first direction Z, and an end thereof in the first direction Z is exposed to an outside of the housing 10. The operation portion 21 is configured to be rotatable about the rotation axis L between the first position P1 and the second position P2. In the present embodiment, the rotation axis L is provided at an end portion of the operation portion 21 in the first direction Z which is located inside the housing 10 (in other words, an end portion of the operation portion 21 closer to the connection surface 11 in the first direction Z). As illustrated in FIG. 2, the first position P1 is a position where the operation portion 21 is adjacent to the side portion 102 of the electronic device 100 which extends in the first direction Z. As illustrated in FIG. 3, the second position P2 is a position farther from the side portion 102 in a circumferential direction with respect to the rotation axis L (hereinafter, referred to as a circumferential direction) than the first position P1.

Figure 5:
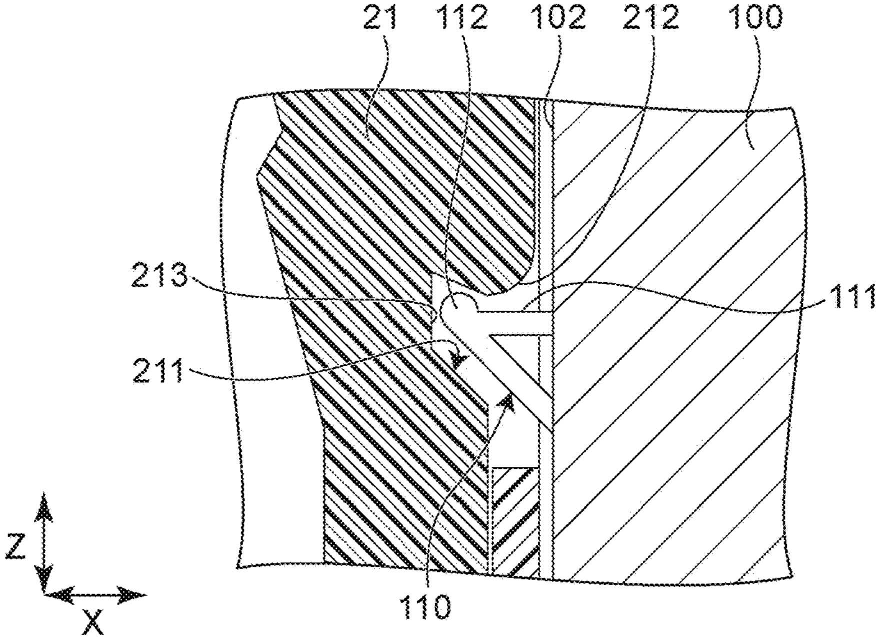
FIG. 5 is an enlarged cross-sectional view of the socket of FIG. 1.

The operation portion 21 includes a recess 211 that opens in a surface facing the electronic device 100 in the circumferential direction. The recess 211 is configured to accommodate the protruding portion 110 of the electronic device 100 when the operation portion 21 is located at the first position P1 and to restrict a movement of the electronic device 100 in the first direction Z and in the direction away from the connection surface 11. Specifically, as illustrated in FIG. 5, the recess 211 includes a curved portion 212 protruding in a direction approaching the rotation axis L in a radial direction with respect to the rotation axis L (hereinafter, referred to as a radial direction) on a side surface farthest from the rotation axis L in the radial direction. In a state where the operation portion 21 is located at the first position P1, the locking portion 112 of the protruding portion 110 is located in a region formed by the curved portion 212 in the recess 211 and a bottom surface 213 of the recess 211. As a result, when the electronic device 100 is connected to the connection surface 11, the protruding portion 110 becomes hard to come out of the recess 211, so that the movement of the electronic device 100 in the first direction Z and in the direction away from the connection surface 11 can be more reliably restricted.

The contact portion 22 extends from the operation portion 21 in the second direction X and in a direction approaching the connection surface 11 and rotates around the rotation axis L together with the operation portion 21. In the present embodiment, the contact portion 22 extends in the radial direction from the end portion of the operation portion 21 in the first direction Z which is located inside the housing 10. As illustrated in FIG. 2, when the operation portion 21 is located at the first position P1, a distal end portion 221 of the contact portion 22 which is far from the operation portion 21 in the second direction X faces the connection surface 11 in the circumferential direction inside the housing 10. As illustrated in FIG. 3, when the operation portion 21 is located at the second position P2, the distal end portion 221 of the contact portion 22 faces the connection surface 11 in the circumferential direction outside the housing 10. That is, when the operation portion 21 is rotated from the first position P1 to the second position P2 in a state where the electronic device 100 is connected to the connection surface 11, the bottom portion 101 of the electronic device 100 is pressed by the contact portion 22, and the electronic device 100 moves in the first direction Z and in the direction away from the connection surface 11.

The socket 1 can exhibit the following effects.

For example, when the operation portion 21 is rotated from the first position P1 to the second position P2 in order to remove the electronic device 100 connected to the connection surface 11, if an excessive force is applied to the operation portion 21, a pressing force of the contact portion 22 to the electronic device 100 becomes too strong, and the electronic device 100 may jump out of the socket 1. In addition, in a case where the terminal connection portion 17 of the electronic device 100 includes a pair of leaf springs, when the electronic device 100 connected to the connection surface 11 is removed, the terminal 120 is biased in the first direction Z and in the direction away from the connection surface 11 by the terminal connection portion 17 at the moment when the terminal connection portion 17 releases the terminal 120 of the electronic device 100 from being held. Also in this case, the electronic device 100 may jump out of the socket 1.

The socket 1 includes the housing 10 including the connection surface 11 to which the electronic device 100 is attached, and the lever 20 attached to the housing 10 to be rotatable about the rotation axis L extending along the connection surface 11. The lever 20 includes the operation portion 21 that extends in the first direction and includes one end in the first direction exposed to the outside of the housing, and the contact portion 22 that extends from the operation portion 21 in the second direction and in the direction approaching the connection surface 11 and rotates about the rotation axis L together with the operation portion 21, and the housing 10 includes the restriction protrusion 14. The operation portion 21 is configured to be rotatable about the rotation axis L between the first position P1 adjacent to the side portion 102 of the electronic device 100 which extends in the first direction and the second position P2 farther from the side portion 102 than the first position P1. In the contact portion 22, when the operation portion 21 is located at the first position P1, the distal end portion 221 in the second direction faces the connection surface 11 in the circumferential direction with respect to the rotation axis L inside the housing 10, and when the operation portion 21 is located at the second position P2, the distal end portion 221 faces the connection surface 11 in the circumferential direction with respect to the rotation axis L outside the housing 10. When the operation portion 21 is rotated from the first position P1 to the second position P2 in a state where the electronic device 100 is connected to the connection surface 11, the restriction protrusion 14 comes into contact with the protruding portion 110 protruding from the side portion 102 of the electronic device 100 toward the operation portion 21 at the second position P2 to restrict the movement of the electronic device 100 in the first direction and in the direction away from connection surface 11. With such a configuration, for example, when the electronic device 100 connected to the connection surface 11 is removed, even if the terminal 120 of the electronic device 100 is biased in the first direction Z and in the direction away from the connection surface 11, it is possible to realize the socket 1 capable of preventing the electronic device 100 from falling.

In the socket 1, the restriction protrusion 14 includes the inclined surface 141 that is disposed to face the connection surface 11 and is inclined to approach the operation portion 21 as being away from the connection surface 11 in the first direction. With such a configuration, when the electronic device 100 connected to the connection surface 11 is removed, the protruding portion 110 of the electronic device 100 easily gets over the restriction protrusion 14 after coming into contact with the restriction protrusion 14. As a result, it is possible to realize the socket 1 in which the electronic device 100 can be easily removed while preventing the electronic device 100 from falling.

In the socket 1, in a state where the electronic device 100 is connected to the connection surface 11, the restriction protrusion 14 is disposed farther from the connection surface 11 than the protruding portion 110 in the first direction and is disposed farther from the protruding portion 110 by a length equal to or larger than the length of the terminal 120. With such a configuration, it is possible to realize the socket 1 capable of more reliably preventing the electronic device 100 from falling.

The socket 1 can also be configured as follows.

Figure 6:
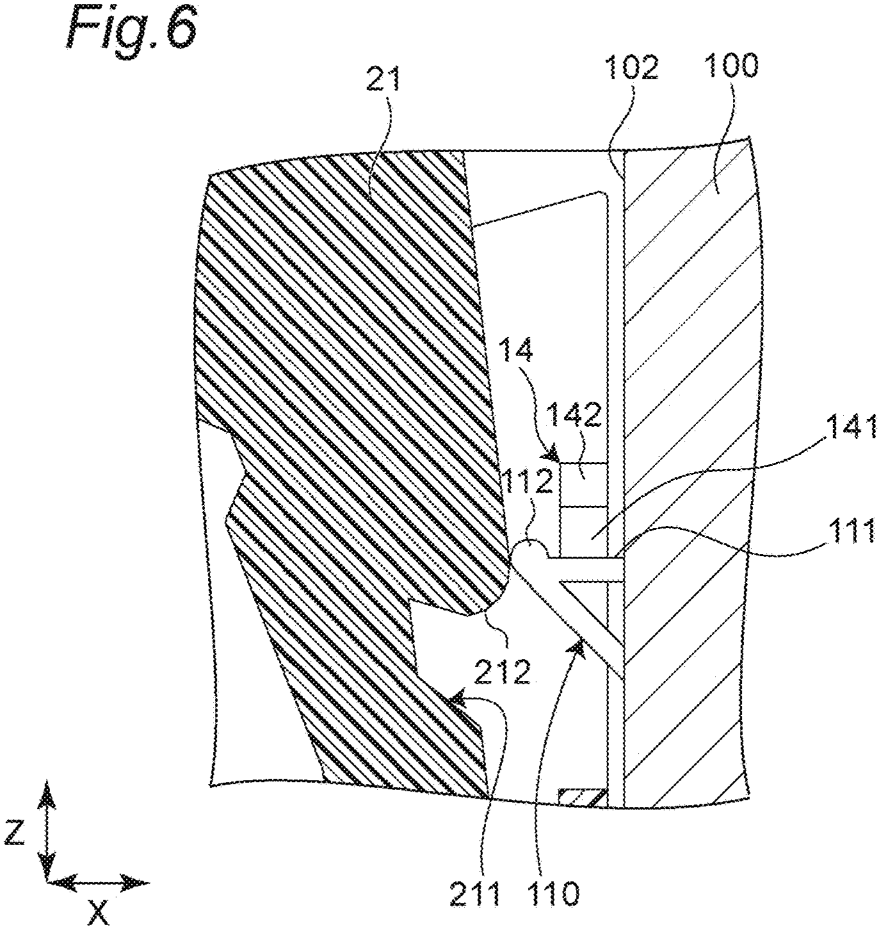
FIG. 6 is an enlarged cross-sectional view illustrating a first modification of the socket of FIG. 1.

The restriction protrusion 14 is not limited to a case where, in a state where the electronic device 100 is connected to the connection surface 11, the restriction protrusion 14 is disposed farther from the connection surface 11 than the protruding portion 110 in the first direction and is disposed farther from the protruding portion 110 by a length equal to or larger than the length of the terminal 120. For example, as illustrated in FIG. 6, the restriction protrusion 14 can be disposed at any positions farther from the connection surface 11 than the curved portion 212 of the recess 211 of the operation portion 21 in the first direction Z.

Figure 7:
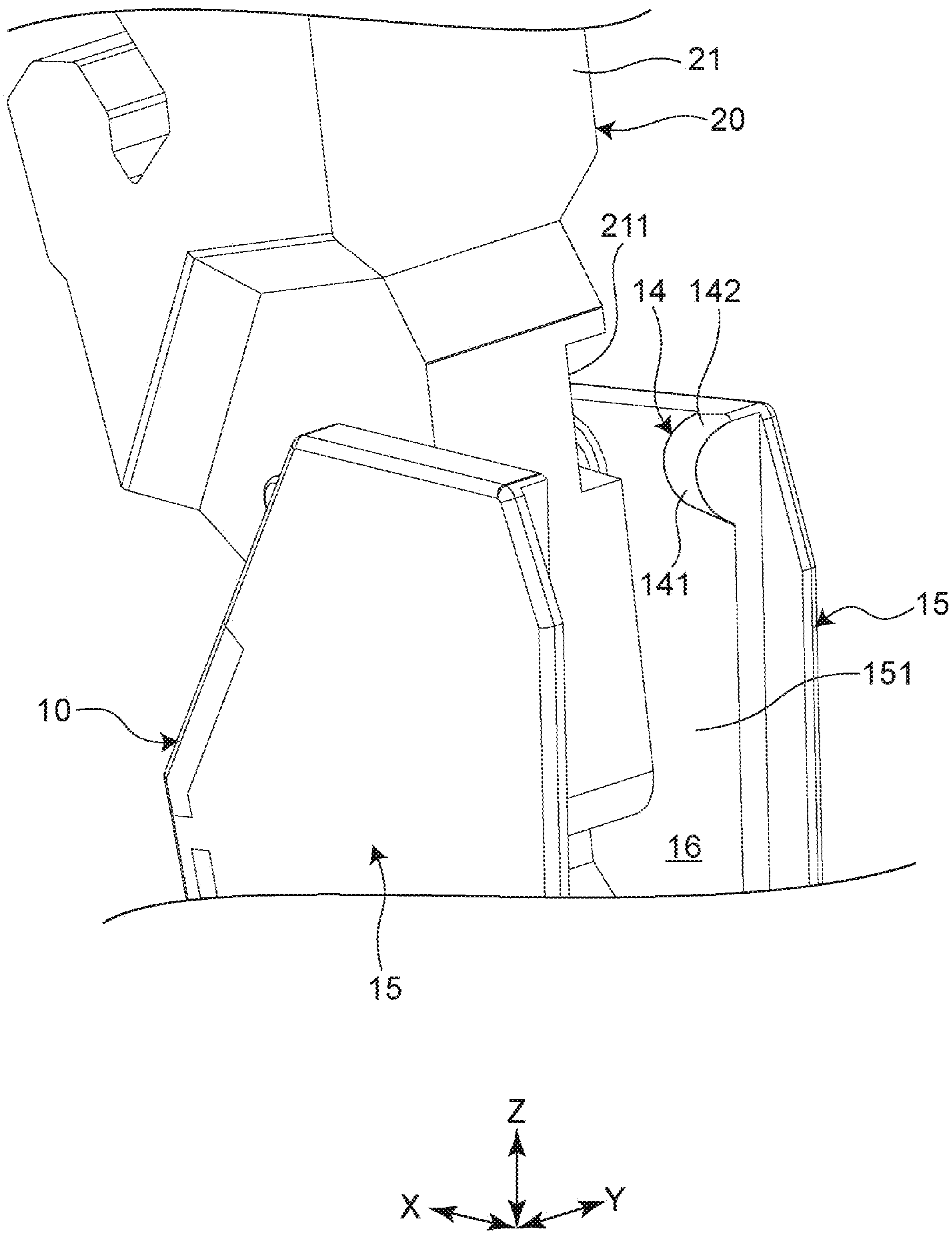
FIG. 7 is an enlarged perspective view illustrating a second modification of the socket of FIG. 1.

The restriction protrusion 14 can adopt any configuration in which the restriction protrusion 14 is in contact with the protruding portion 110 of the electronic device 100 at the second position P2 to restrict the movement of the electronic device 100 in the first direction and in the direction away from the connection surface 11. For example, the restriction protrusion 14 may have a shape without the inclined surfaces 141 and 142 (for example, a substantially rectangular parallelepiped shape), or may have only the inclined surface 141 that can come into contact with the protruding portion 110. As illustrated in FIG. 7, the restriction protrusion 14 may have inclined surfaces 141 and 142 protruding and curved in a direction away from the support wall portion 15. With such a configuration, it is possible to realize the socket 1 in which the electronic device 100 can be more easily removed while preventing the electronic device 100 from falling.

The present disclosure is not limited to the electronic device 100 and can apply to a socket to which an electronic device 100 including a protruding portion configured to be able to be accommodated in a recess 211 when an operation portion 21 is located at a first position P1 and to be contactable with a restriction protrusion 14 when the operation portion 21 is located at a second position P2 is connected.

Various embodiments of the present disclosure have been described above in detail with reference to the drawings. Finally, various aspects of the present disclosure will be described. In the following description, as an example, reference numerals are also added.

A socket 1 according to a first aspect of the present disclosure includes:

a housing 10 including a connection surface 11 to which an electronic device is connected; and a lever 20 attached to the housing 10 to be rotatable about a rotation axis extending along the connection surface 11, wherein the lever 20 includes:

an operation portion 21 that extends in a first direction intersecting the connection surface 11, includes an end in the first direction exposed to an outside of the housing 10, and is rotatable about the rotation axis between a first position P1 adjacent to a side portion of the electronic device which extends in the first direction and a second position P2 that is farther from the side portion in a circumferential direction with respect to the rotation axis than the first position P1; and a contact portion 22 that extends from the operation portion 21 in a second direction intersecting the first direction and in a direction approaching the connection surface 11 and rotates about the rotation axis together with the operation portion 21, and wherein when the operation portion 21 is located at the first position P1, a distal end portion 221 far from the operation portion 21 in the second direction faces the connection surface 11 in the circumferential direction inside the housing 10, and when the operation portion 21 is located at the second position P2, the distal end portion 221 faces the connection surface 11 in the circumferential direction outside the housing 10, and wherein the housing 10 includes a restriction protrusion 14 that comes into contact with a protruding portion protruding from the side portion of the electronic device toward the operation portion 21 at the second position P2 to restrict a movement of the electronic device in the first direction and in a direction away from the connection surface 11 when the operation portion 21 is rotated from the first position P1 to the second position P2 in a state where the electronic device is connected to the connection surface 11.

In a socket 1 according to a second aspect of the present disclosure, the restriction protrusion 14 includes an inclined surface 141 that is disposed to face the connection surface 11 and is inclined so as to approach the operation portion 21 as being away from the connection surface 11 in the first direction.

In a socket 1 according to a third aspect of the present disclosure, the inclined surface 141 is a curved surface protruding in a direction approaching the operation portion 21.

In a socket 1 according to a fourth aspect of the present disclosure, the electronic device includes a terminal that extends in the first direction from a bottom portion facing the connection surface 11 and is accommodated in the housing when the electronic device is connected to the connection surface 11, and the restriction protrusion 14 is disposed farther from the connection surface 11 than the protruding portion in the first direction and is disposed farther from the protrusion by a length equal to or larger than a length of the terminal in a state where the electronic device is connected to the connection surface 11.

By appropriately combining any embodiments or modifications among the various embodiments or modifications, the effects of the respective embodiments or modifications can be achieved. In addition, combinations of embodiments, combinations of examples, or combinations of embodiments and examples are possible, and combinations of features in different embodiments or examples are also possible.

Although the present disclosure has been fully described in connection with preferred embodiments with reference to the accompanying drawings, various modifications and corrections will be apparent to those skilled in the art. Such modifications and corrections are to be understood as being included within the scope of the present disclosure as set forth in the appended claims.

INDUSTRIAL APPLICABILITY

The socket of the present disclosure can be applied to, for example, a terminal block to which an electromagnetic relay can be connected.

REFERENCE SIGNS LIST

1 socket
10 housing
11 connection surface
12 attachment portion
13 wiring connection portion
14 restriction protrusion
141, 142 inclined surface
15 support wall portion
151 inner surface
16 gap
17 terminal connection portion
20 lever
21 operation portion
211 recess
212 curved portion
213 bottom surface
22 contact portion
221 distal end portion
100 electronic device
101 bottom portion
102 side portion
110 protruding portion
111 facing surface
112 locking portion
120 terminal

What is claimed is:

1. A socket, comprising:

a housing including a connection surface to which an electronic device is connected; and a lever attached to the housing to be rotatable about a rotation axis extending along the connection surface, wherein the lever includes:

an operation portion that extends in a first direction intersecting the connection surface, includes an end in the first direction exposed to an outside of the housing, and is rotatable about the rotation axis between a first position adjacent to a side portion of the electronic device which extends in the first direction and a second position that is farther from the side portion in a circumferential direction with respect to the rotation axis than the first position; and a contact portion that extends from the operation portion in a second direction intersecting the first direction and in a direction approaching the connection surface and rotates about the rotation axis together with the operation portion, wherein when the operation portion is located at the first position, a distal end portion far from the operation portion in the second direction faces the connection surface in the circumferential direction inside the housing, and when the operation portion is located at the second position, the distal end portion faces the connection surface in the circumferential direction outside the housing, and wherein the housing includes a restriction protrusion that comes into contact with a protruding portion protruding from the side portion of the electronic device toward the operation portion at the second position to restrict a movement of the electronic device in the first direction and in a direction away from the connection surface when the operation portion is rotated from the first position to the second position in a state where the electronic device is connected to the connection surface.

2. The socket according to claim 1, wherein the restriction protrusion includes an inclined surface that is disposed to face the connection surface and is inclined to approach the operation portion as being away from the connection surface in the first direction.

3. The socket according to claim 2, wherein the inclined surface is a curved surface protruding in a direction approaching the operation portion.

4. The socket according to claim 3, wherein the electronic device includes a terminal that when the electronic device is connected to the connection surface, extends in the first direction from a bottom portion facing the connection surface and is accommodated in the housing, and the restriction protrusion is disposed farther from the connection surface than the protruding portion in the first direction and is disposed farther from the protrusion by a length equal to or larger than a length of the terminal in a state where the electronic device is connected to the connection surface.

5. The socket according to claim 2, wherein the electronic device includes a terminal that when the electronic device is connected to the connection surface, extends in the first direction from a bottom portion facing the connection surface and is accommodated in the housing, and the restriction protrusion is disposed farther from the connection surface than the protruding portion in the first direction and is disposed farther from the protrusion by a length equal to or larger than a length of the terminal in a state where the electronic device is connected to the connection surface.

6. The socket according to claim 1, wherein the electronic device includes a terminal that when the electronic device is connected to the connection surface, extends in the first direction from a bottom portion facing the connection surface and is accommodated in the housing, and the restriction protrusion is disposed farther from the connection surface than the protruding portion in the first direction and is disposed farther from the protrusion by a length equal to or larger than a length of the terminal in a state where the electronic device is connected to the connection surface.

* * * * *